United States Patent
Caldwell et al.

(10) Patent No.: US 6,793,812 B2
(45) Date of Patent: Sep. 21, 2004

(54) FLUID FILTRATION ASSEMBLY COMBINING RETURN-SIDE AND SUPPLY-SIDE FILTERS FOR USE IN A VEHICLE TRANSMISSION

(75) Inventors: Craig S. Caldwell, Kenosha, WI (US); Clifford D. Loveland, White Lake, MI (US); George C. Lee, Novi, MI (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 09/900,344

(22) Filed: Jul. 6, 2001

(65) Prior Publication Data

US 2003/0006085 A1 Jan. 9, 2003

(51) Int. Cl.[7] .............................................. B01D 35/027
(52) U.S. Cl. ..................... 210/168; 210/171; 210/172; 210/196; 210/252; 210/335; 210/445; 210/455
(58) Field of Search ................................ 210/168, 172, 210/323.1, 335, 445, 455, 171, 196, 252, 256, 257.1, 259, 260

(56) References Cited

U.S. PATENT DOCUMENTS 3,371,793 A * 3/1968 Fowler ........................ 210/445
3,945,208 A * 3/1976 O'Connor ..................... 60/420
4,136,011 A * 1/1979 Joseph et al. ................ 210/168
6,190,546 B1 * 2/2001 Agner ......................... 210/168

FOREIGN PATENT DOCUMENTS

FR          2764636       * 12/1998       .......... F01M/11/03

* cited by examiner

*Primary Examiner*—Matthew O. Savage
(74) *Attorney, Agent, or Firm*—Baker & Hostetler, LLP

(57) ABSTRACT

A fluid filtration assembly (10) operable to provide both return-side and supply-side filtration, as, for example, of a fluid entering and leaving a sump (14) as it circulates in a vehicle transmission (12). The fluid filtration assembly (10) broadly comprises a return-side filter (18) and a supply-side filter (20). The return-side filter (18) includes a filter media (33) operable to filter relatively small particles. Fluid flow through the return-side filter (18) may be accomplished using any of three described alternative embodiments, including upflow, downflow, and direct feed. The supply-side filter (20) includes a filter media (42) for filtering needed fluid as it is drawn back into circulation. The supply-side filter media (42) is a low restriction filter media operable to filter only relatively large particles, thereby decreasing bottle-neck effects and minimizing pressure drops.

12 Claims, 6 Drawing Sheets

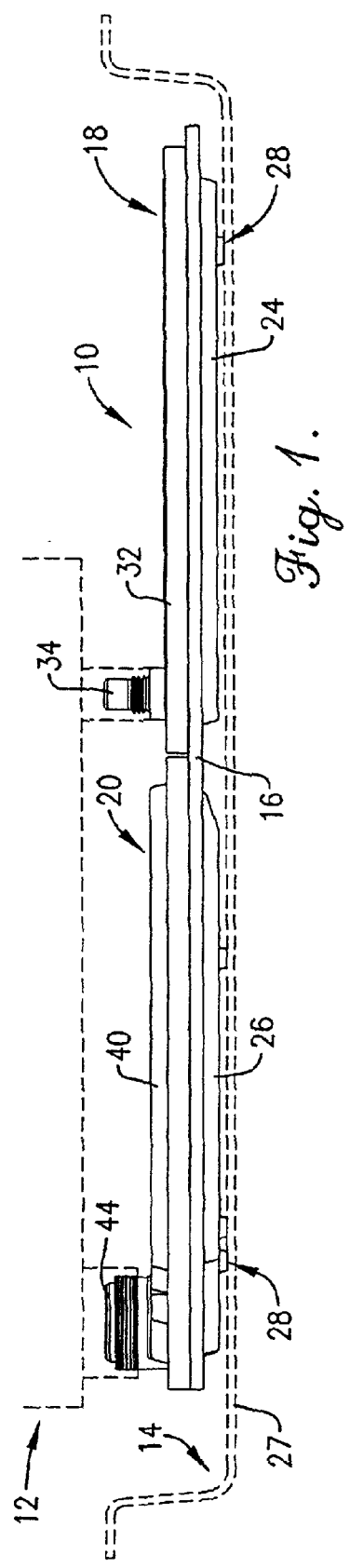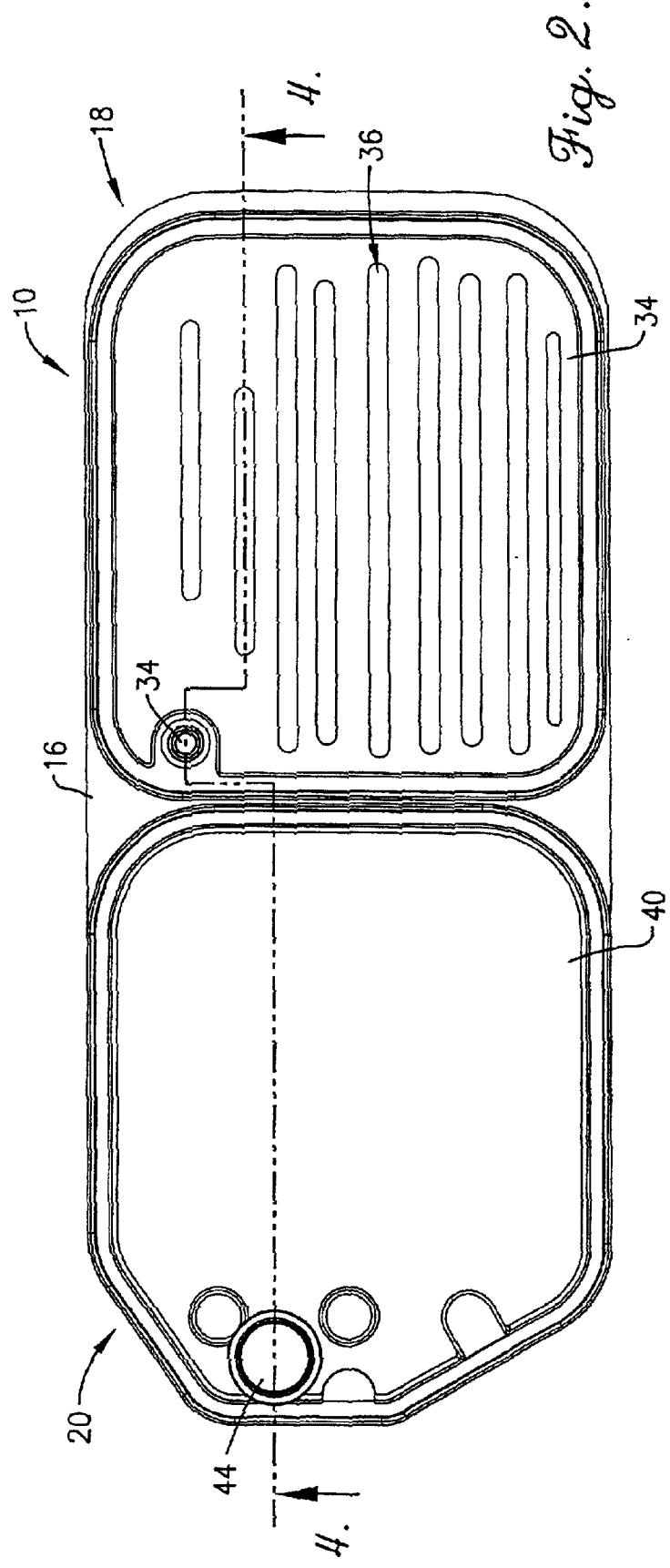

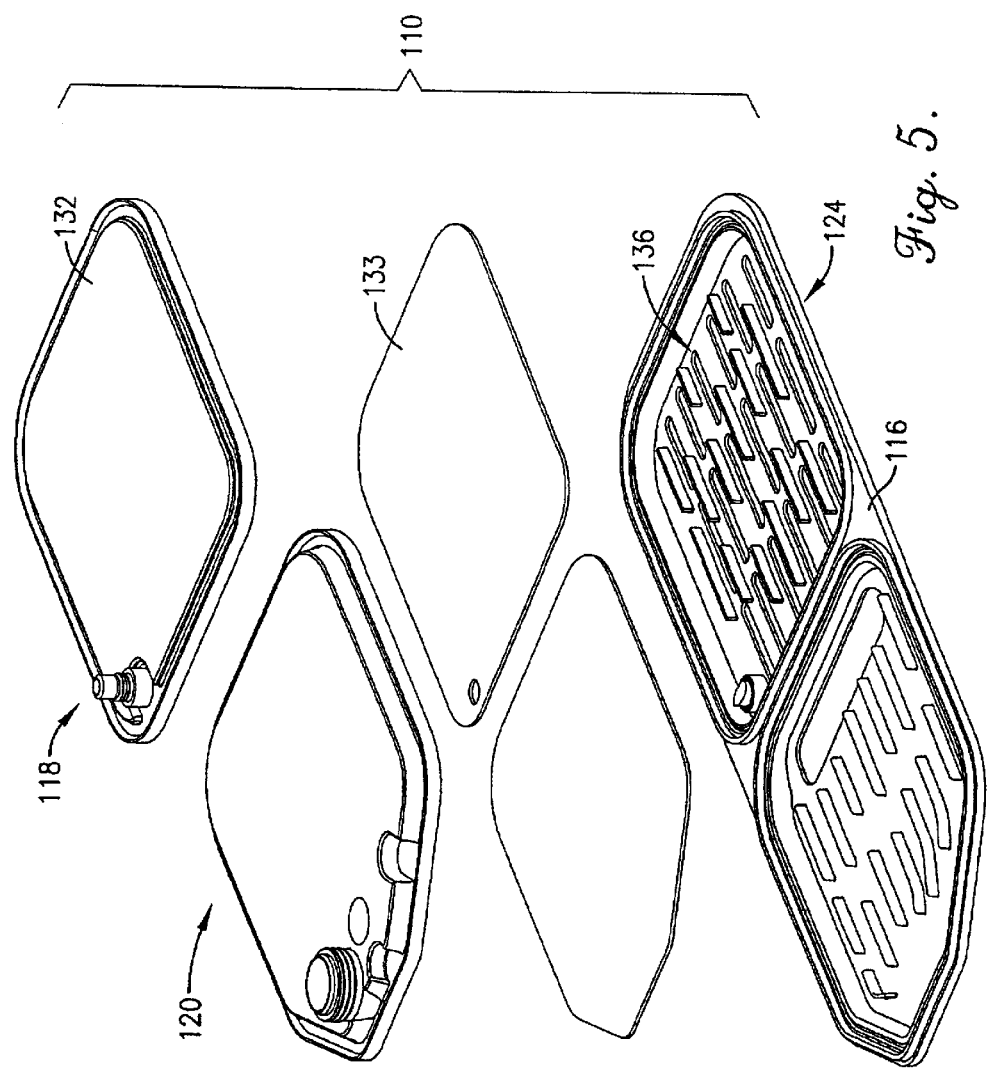

FLUID FILTRATION ASSEMBLY COMBINING RETURN-SIDE AND SUPPLY-SIDE FILTERS FOR USE IN A VEHICLE TRANSMISSION

BACKGROUND OF THE INVENTION

1. Field of the Invention

The present invention relates to systems for filtering fluids in vehicles. More particularly, the present invention relates to a fluid filtration assembly combining return-side and supply-side filters to filter a circulating fluid as it enters and leaves a sump portion of a vehicle transmission.

2. Description of the Prior Art

As will be appreciated by those with ordinary skill in the automotive arts, an automatic transmission is a complex hydraulic circuit whose primary purpose is to allow an engine to operate in a narrow RPM (revolutions per minute) band while providing a wide range of output speeds. The transmission uses a fluid, typically a light oil, to create a hydraulic coupling that converts engine power to hydraulic pressure. The fluid serves other purposes as well, including lubrication and heat transfer. As it circulates through the transmission, the fluid collects damaging particulates such that it is desirable to filter the fluid at some point prior to recirculation. Commonly, fluid filtration takes place as the fluid is drawn back into circulation from a sump or reservoir.

Unfortunately, existing filtration systems suffer from a number of disadvantages. Filtering for small particulates, for example, as the fluid is drawn back into circulation creates a bottleneck effect that can result in undesirable drops in fluid pressure. This is of particular concern during cold flow conditions. Furthermore, because it alone provides all filtration, the single supply-side filter can clog when tasked to remove large amounts of contaminant, resulting in poor performance but for burdensomely frequent filter changes or cleanings.

It is known in the art to incorporate a spin-on filter to perform at least some filtration as the fluid enters the sump. Unfortunately, the nature and design of the spin-on filter is so substantially different from the typical supply-side filter that no interchangeability or shared structural components, desirable from a design and manufacturing standpoint, is possible. Furthermore, transmission designs are not easily adapted to accommodate the spin-on filter.

Due to the above-identified and other problems in the art, a need exists for an improved fluid filtration assembly or method.

SUMMARY OF THE INVENTION

The fluid filtration assembly of the present invention overcomes the above-identified and other problems in the art to provide a simple and inexpensive integrated assembly advantageously and efficiently accomplishing both return-side and supply-side filtration of a fluid as it enters and leaves a sump portion of a vehicle transmission. This two-stage filtration aids to mitigate or substantially eliminate bottleneck effects and fluid pressure drops at the supply-side.

The preferred fluid filtration assembly comprises a common housing component; a return-side filter; and a supply-side filter. The common housing component provides a substantial advantage in that it allows for design and manufacturing efficiencies not possible with existing spin-on filter technology. Furthermore, by sharing the common housing component, be it a bottom, top, or side wall, the return-side and supply-side filters are integrated into a single fluid filtration assembly conveniently locatable in the sump where it is easily accessed for maintenance. Additionally, the common housing component facilitates the direct flow embodiment described below.

The return-side filter is operable to filter at least a portion of the fluid as it enters or returns to the sump, with any remaining fluid flowing directly into the sump. The return-side filter includes a return-side filter media operable to filter both large and relatively small particulates, and may also include a magnet operable to trap and hold metal particles or shavings that would otherwise prematurely clog the filter media. Fluid flow through the return-side filter may be accomplished using any of three alternative embodiments, including upflow, downflow, and direct feed configurations. In the upflow embodiment, the fluid enters beneath and rises through the return-side filter media to exit at or near the top of the return-side filter and empty into the sump. One advantage of the upflow embodiment is that particulates are allowed to settle out of the fluid before exposure to the filter media, thereby extending the filter media's operational life. In the downflow embodiment, the fluid enters above and flows downward through the return-side filter media to exit at or near the bottom of the return-side filter and empty into the sump. In the direct flow embodiment, regardless of where the fluid enters or how it is filtered within the return-side filter, the filtered fluid thereafter flows directly to the supply-side filter rather than into the sump.

The supply-side filter receives fluid either from the sump, directly from the return-side filter, or some combination thereof, filters the fluid again, and then releases the fluid back into circulation. Because a substantial amount of undesirable particulates are removed from the fluid by the return-side filter media, possibly aided by the settling action of the upflow embodiment, the supply-side filter media can be a low-restriction filter media operable to remove only relatively large particulates, which advantageously decreases bottle-neck effects and minimizes fluid pressure drops.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein:

FIG. 1 is a side elevational view of a preferred embodiment of the fluid filtration assembly of the present invention, wherein portions of an automatic transmission are shown in broken lines to illustrate an operating environment and thereby enhance clarity of understanding;

FIG. 2 is a top plan view of a preferred first embodiment of the fluid filtration assembly of the present invention;

FIG. 5 is an exploded isometric view of a preferred second embodiment of the fluid filtration assembly the present invention;

DETAILED DESCRIPTION OF A PREFERRED EMBODIMENT

Figure 3:
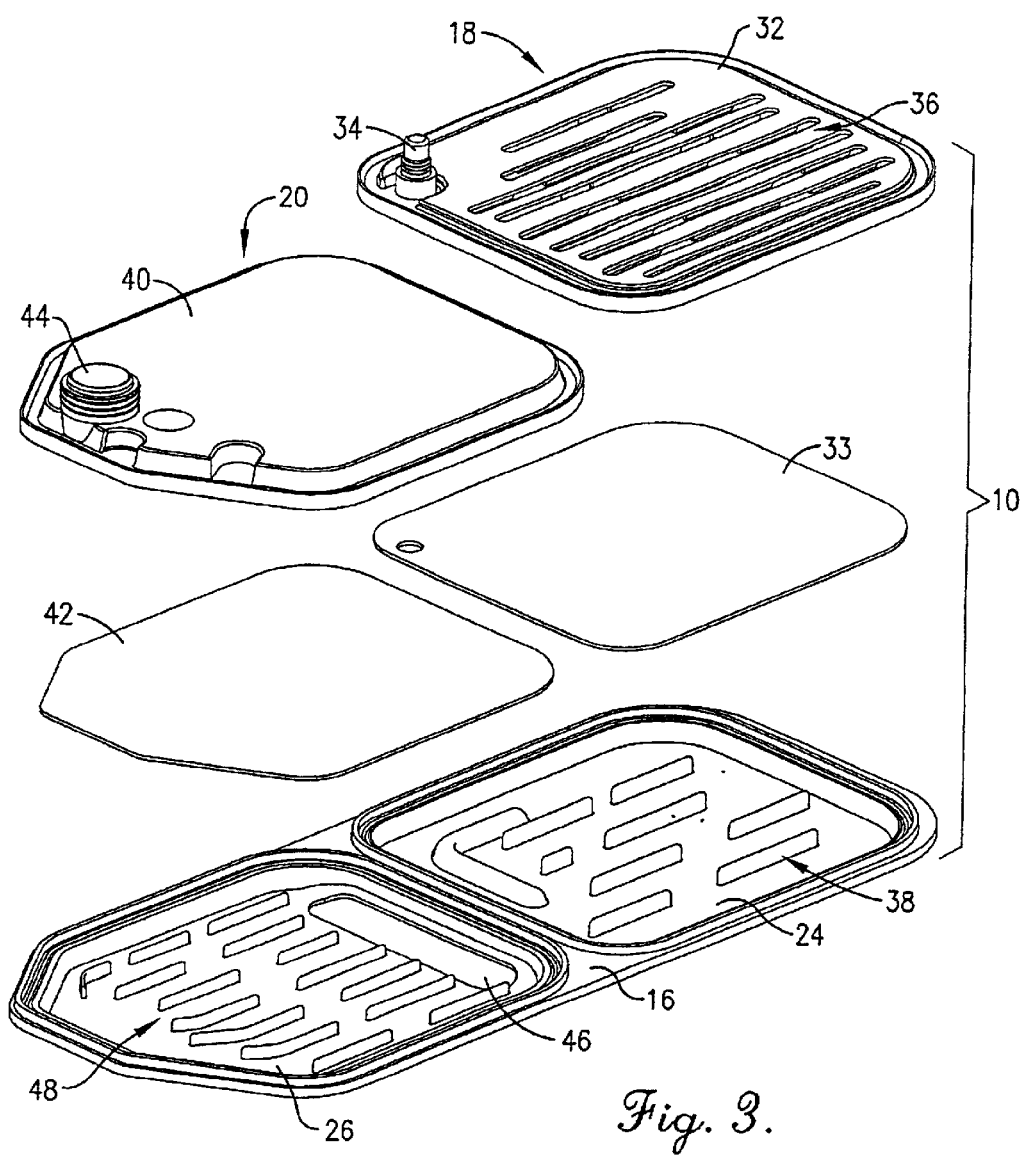
FIG. 3 is an exploded isometric view of the preferred first embodiment shown in FIG. 2.

Referring to FIGS. 1, 2, and 3, a fluid filtration assembly 10 is shown constructed in accordance with a preferred first embodiment of the present invention and therefore operable to provide both return-side and supply-side filtration of a circulating fluid. The fluid filtration assembly 10 is preferably located in a sump or reservoir 14 of a transmission 12, and broadly comprises a common housing component 16; a return-side filter 18; and a supply-side filter 20.

The common housing component 16 is shared between the return-side and supply-side filters 18,20, thereby integrating the two into a single assembly and providing substantial design and manufacturing advantages. Furthermore, the common housing component 16, be it a bottom, top, or side wall, allows the two filters 18, 20 to be located within the sump 14 where they are conveniently and efficiently simultaneously accessible for maintenance. Additionally, the common housing component 16 facilitates the direct flow embodiment described below.

In the illustrated embodiments, the common housing component 16 is a common bottom 16 comprising both a return-side pan 24 and a supply-side pan 26 associated, respectively, with the return-side and supply-side filters 18, 20. The common bottom 16 preferably presents a plurality of legs 28 projecting downwardly from a bottom side of each pan 24,26 and operable to rest upon a pan portion 27 of the sump 14 and thereby provide spatial separation within which the fluid can pool and particulates can settle out. The base structure 16 is preferably constructed of a suitably lightweight, durable, and inexpensive material such as nylon that is 30%–33% glass-filled.

The return-side filter 18 is operable to receive and filter at least a return fluid portion of the fluid, with any remaining fluid emptying directly into the sump pan 27. The return-side filter 18 broadly comprises a return-side lid 32; the return-side pan 24; and a return-side filter media 33. The return-side lid 32 is operable to fit over, secure to, and cover that portion of the common bottom 16 which defines the return-side pan 24. The return-side lid 32 presents an upwardly opening inlet 34 operable to receive the return fluid, and a plurality of fluid release slots 36 operable to release the filtered return fluid into the sump pan 27. In alternative embodiments described below, the fluid release slots 36 appear in the pan 24 rather than the lid 32, or are absent altogether. The return-side lid 32 is also preferably constructed of a suitably lightweight, durable, and inexpensive material such as nylon that is 30%–33% glass-filled.

The return-side filter media 33 is operable to filter both large and relatively small particles from the return fluid. The return-side filter media 33 is preferably held securely in its operational position between the return-side lid 32 and pan 24 by spacers 38 projecting downwardly from the former and upwardly from the latter.

The supply-side filter 20 is operable to draw, filter, and return to circulation a supply fluid portion of the fluid, wherein the supply fluid may comprise in whole or in part the return fluid or a portion thereof. The supply-side filter 20 broadly comprises a supply-side lid 40; the supply-side pan 26; and a supply-side filter media 42. The supply-side lid 40 is operable to fit over, secure to, and cover that portion of the common bottom 16 which defines the supply-side pan 26. The supply-side lid 40 presents an upwardly opening outlet 44 operable to return fluid to circulation in the transmission 12. The supply-side lid 40 is also preferably constructed of a suitably lightweight, durable, and inexpensive material such as nylon that is 30%–33% glass-filled. The supply-side pan 26 includes a large opening 46 through which fluid may be drawn from the sump pan 27 for filtration and recirculation via the outlet 44.

The supply-side filter media 42 is operable to filter only relatively large particulates from the fluid. Because it is less restrictive than the return-side filter media 33, the supply-side filter media 42 avoids causing or exacerbating undesirable bottleneck effects and drops in fluid pressure. The supply-side filter media 42 is preferably held securely in its operational position between the supply-side lid 40 and pan 26 by spacers 48 projecting downwardly from the former and upwardly from the latter.

Figure 4:
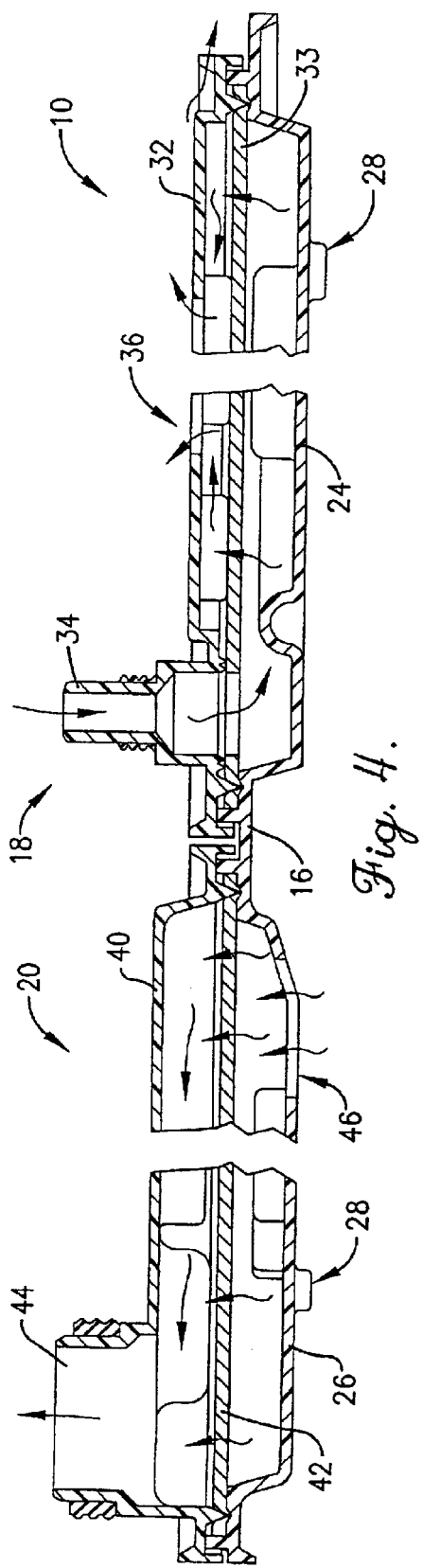
FIG. 4 is a side elevational fragmentary sectional view taken along line 4—4 of FIG. 2, wherein arrows are used to illustrate direction of fluid flow.

In operation, referring also to FIG. 4, the fluid filtration assembly 10 of the present invention is properly installed by removing the sump pan 27 from the transmission 12, coupling the return-side inlet 34 and the supply-side outlet 44 with corresponding components of the transmission 12, and replacing the sump pan 27 so that the standoffs 28 projecting downwardly from the common bottom 16 provide spatial separation wherein the fluid can pool and particulates can settle out.

Thereafter, as the fluid circulates through the operating transmission 12, a return fluid portion, possibly as much as one-half gallon per minute, will enter the return-side inlet 34. Fluid in excess of this amount is deposited directly into the sump pan 27. The return fluid is directed under the return-side filter media 33 to the return-side pan 24 where gravity may cause at least some particulates to settle out. As the return fluid level rises in the pan 24, the return fluid is forced against and through the return-side filter media 33 and then out the fluid release slots 36 to spill over the return-side lid 32 and into the sump pan 27.

Suction at the supply-side outlet 44 draws needed fluid back into circulation. This suction causes a supply fluid portion of the fluid in the sump 14 to be drawn into the supply-side pan 26 via the large opening 46, against and through the supply-side filter media 42; and out the outlet 44. As will be appreciated, the supply fluid may comprise in whole or in part the return fluid or a portion thereof released into the sump pan 27 by the return-side filter 20.

Figure 6:
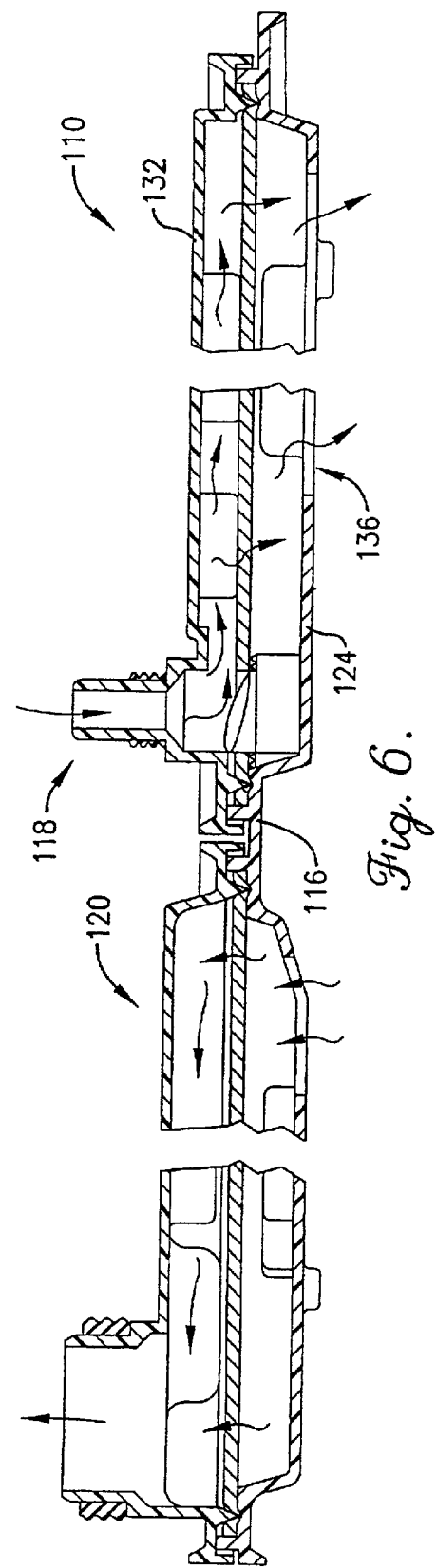
FIG. 6 is a side elevational fragmentary sectional view of the preferred second embodiment shown in FIG. 5, wherein arrows are used to illustrate direction of fluid flow.

Referring to FIGS. 5 and 6, a preferred alternative second embodiment of the fluid filtration assembly 110 is shown similarly operable to provide both inflow and outflow filtration of the fluid. The fluid filtration assembly 110 is substantially identical in structure, broadly comprising the common bottom 116; the return-side filter 118; and the supply-side filter 120. In the preferred second embodiment, however, the fluid release slots 136 appear in the return-side pan 124 rather than the return-side lid 132. Operational flow of the return fluid through the return-side filter 118 is over, down, and through the return-side filter media 133, rather than under, up, and through as in the first embodiment described above. The filtered return fluid then exits via the release slots 136. Supply-side filter 120 operation is substantially identical to that described above.

Figure 7:
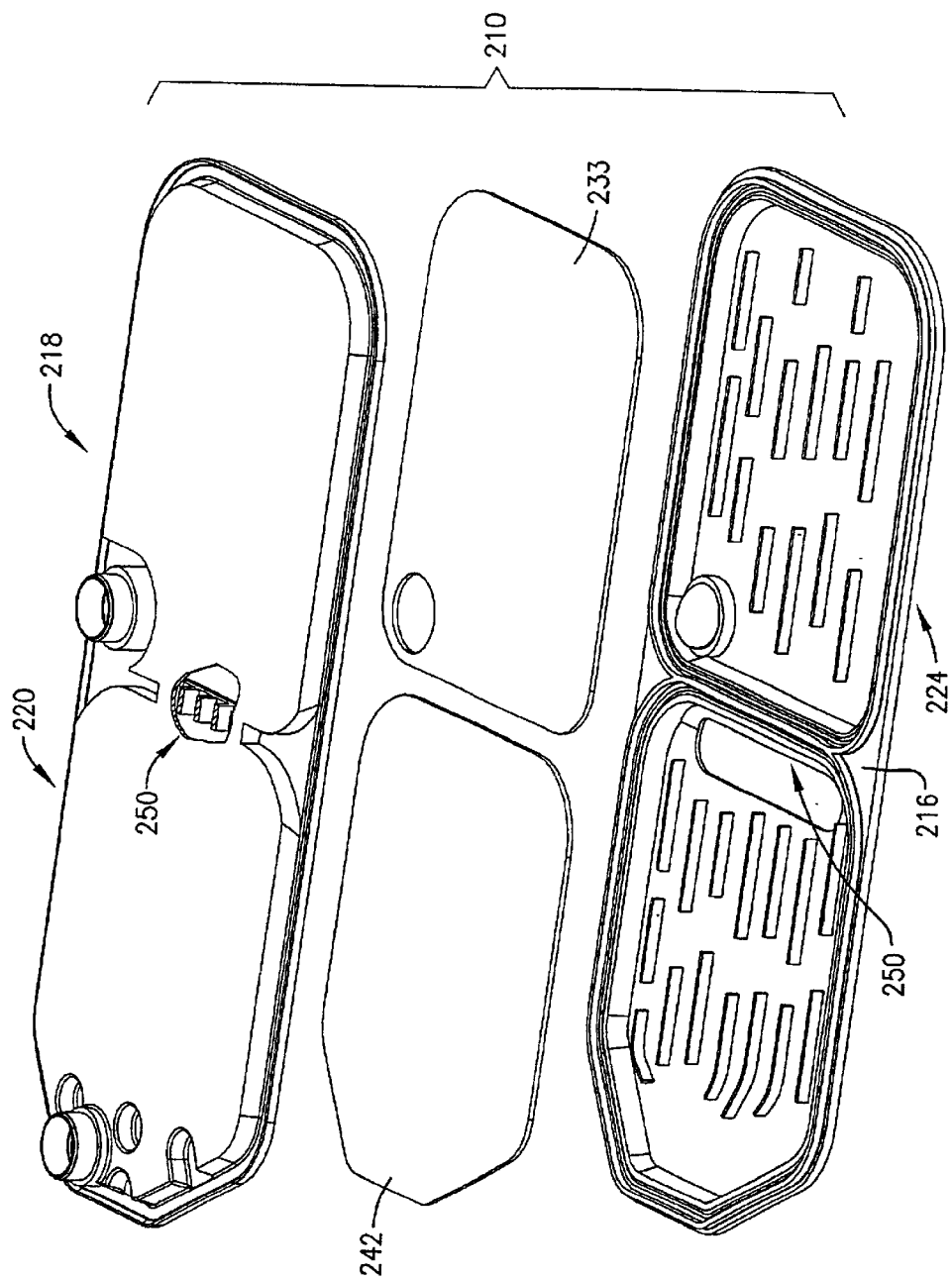
FIG. 7 is an exploded isometric view of a preferred third embodiment of the fluid filtration assembly of the present invention.
Figure 8:
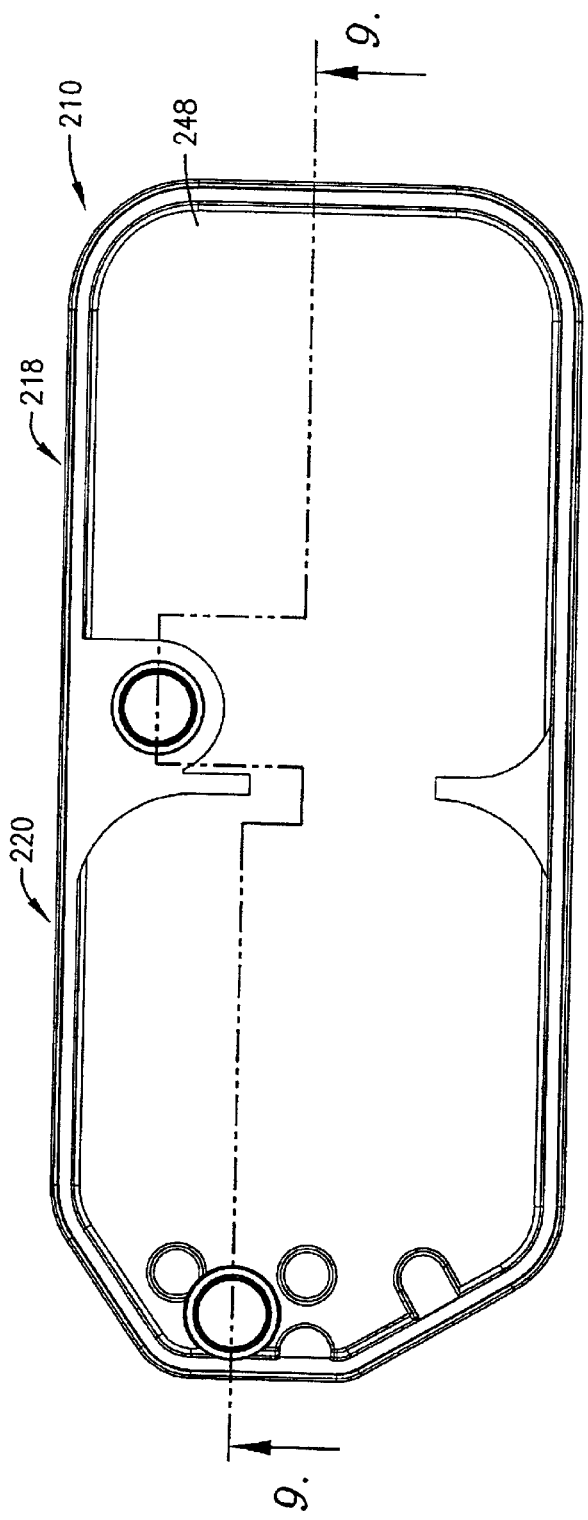
FIG. 8 is a top plan view of the preferred third embodiment shown in FIG. 7.
Figure 9:
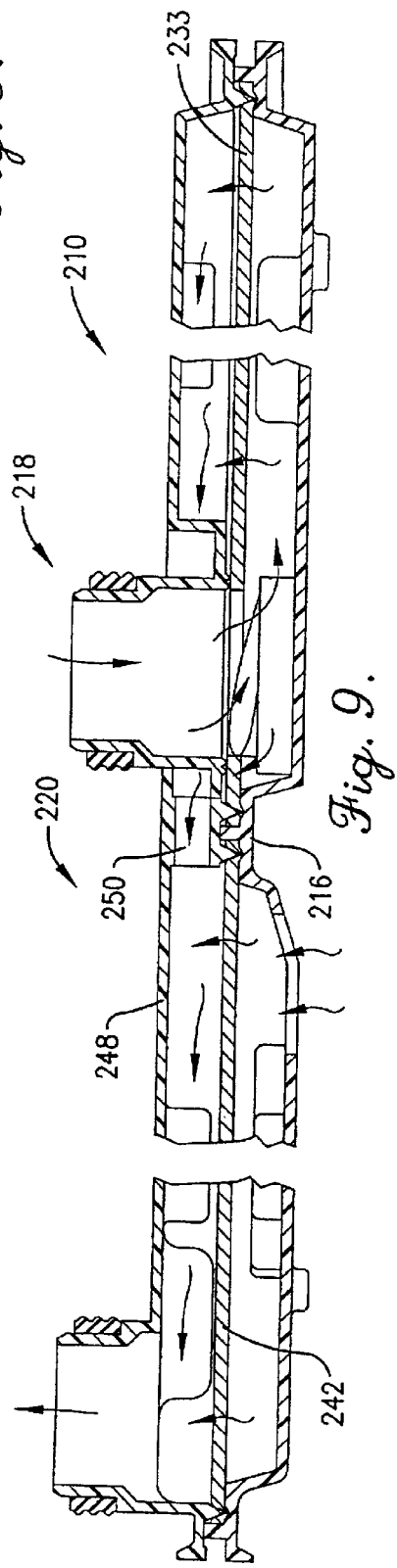
FIG. 9 is a side elevational fragmentary sectional view taken along line 9—9 of FIG. 7, wherein arrows are used to illustrate direction of fluid flow.

Referring to FIGS. 7, 8, and 9, a preferred alternative third embodiment of the fluid filtration assembly 210 is shown similarly operable to provide both inflow and outflow filtration of the fluid. The fluid filtration assembly 210 is substantially similar in structure, broadly comprising the common bottom 216; the return-side filter 218; and the supply-side filter 220. The preferred third embodiment eliminates separate return-side and supply-side lids in favor of a single common lid 248. Furthermore, return-side fluid release slots are eliminated from both the return-side lid 232 and pan 224. Instead, a flow hole 250 allows the filtered return fluid to flow directly from the return-side filter 218 to the supply-side filter 220. Thus, operational return fluid flow through the return-side filter 218 maybe, as desired, under, up, and through the return-side filter media 233 or over, down, and through the return-side filter media 233. Regardless of flow direction during filtering, the filtered return fluid is released directly into the supply-side filter 220 via the flow hole 250, whereafter the return fluid may be immediately released into circulation or filtered again using the supply-side filter media prior to such release.

As will be appreciated by those with ordinary skill in the relevant arts, the flow hole 250 is not limited to the illustrated flowpath facilitated by the common lid 248. Rather, the flow hole 250 maybe implemented as any suitable flowpath connecting the two filters 218, 220, including, for example, a rubber or reinforced hose or elongated channel or ductwork.

From the preceding description, it can be seen that the fluid filtration assembly of the present invention, in its various described embodiments, provides an improved system for filtering a fluid circulating in a vehicle transmission. A number of design and manufacturing advantages are provided, including dual filtration; integrated return-side and supply-side filters; common housing components; mitigated or substantially eliminated bottleneck effects; and mitigated or substantially eliminated fluid pressure drops.

Although the invention has been described with reference to the three preferred embodiments illustrated in the attached drawings, it is noted that equivalents may be employed and substitutions made herein without departing from the scope of the invention as recited in the claims. For example, it is contemplated that the lid, bottom, pan, and filter shapes and construction may be altered or adapted to particular applications while still achieving the same effects and advantages, both recited and unrecited, as the present invention.

Having thus described the preferred embodiment of the invention, what is claimed as new and desired to be protected by Letters Patent includes the following:

1. A fluid filtration assembly for filtering a fluid in a vehicle transmission, the fluid filtration assembly comprising:
   a housing including an upper supply side lid connected to a lower supply side pan, and an upper return side lid connected to a lower return side pan;
   a supply side filter media sealingly disposed between said supply side lid and said supply side pan to form a lower supply side inlet chamber and an upper supply side outlet chamber;
   a return side filter media sealingly disposed between said return side lid and said return side pan to form a lower return side inlet chamber and an upper return side outlet chamber;
   a supply side outlet on said supply side lid for connecting the supply side outlet chamber to a supply side inlet of said transmission;
   a return side inlet on said return side lid for connecting the return side inlet chamber to a return side outlet of said transmission;
   a supply side inlet on said supply side pan for connecting a sump of said transmission to the supply side inlet chamber; and
   a return side outlet on said return side lid for connecting the return side outlet chamber to said sump.

2. The fluid filtration assembly according to claim 1, wherein said lower supply side pan and said lower return side pan are formed as one piece.

3. The fluid filtration assembly according to claim 1, wherein said return side filter media is operable to remove particulates at least of a first size and the supply side filter media is operable to remove particulates of at least a second size, and the particulates of the first size being smaller than particulates of the second size.

4. The fluid filtration assembly according to claim 1, further comprising said vehicle transmission including said sump, wherein said filtration assembly is disposed in said sump.

5. A fluid filtration assembly for filtering a fluid in a vehicle transmission, the fluid filtration assembly comprising:
   a housing including an upper supply side lid connected to a lower supply side pan, and an upper return side lid connected to a lower return side pan;
   a supply side filter media sealingly disposed between said supply side lid and said supply side pan to form a lower supply side inlet chamber and an upper supply side outlet chamber;
   a return side filter media sealingly disposed between said return side lid and said return side pan to form an upper return side inlet chamber and a lower return side outlet chamber;
   a supply side outlet on said supply side lid for connecting the supply side outlet chamber to a supply side inlet of said transmission;
   a return side inlet on said return side lid for connecting the return side inlet chamber to a return side outlet of said transmission;
   a supply side inlet on said supply side pan for connecting a sump of said transmission to the supply side inlet chamber; and
   a return side outlet on said return side pan for connecting the return side outlet chamber to said sump.

6. The fluid filtration assembly according to claim 5, wherein said lower supply side pan and said lower return side pan are formed as one piece.

7. The fluid filtration assembly according to claim 5, wherein said return side filter media is operable to remove particulates at least of a first size and the supply side filter media is operable to remove particulates of at least a second size, and the particulates of the first size being smaller than particulates of the second size.

8. The fluid filtration assembly according to claim 5, further comprising said vehicle transmission including said sump, wherein said filtration assembly is disposed in said sump.

9. A fluid filtration assembly for filtering a fluid in a vehicle transmission, the fluid filtration assembly comprising:
   a housing including an upper supply side lid connected to a lower supply side pan, and an upper return side lid connected to a lower return side pan;
   a supply side filter media sealingly disposed between said supply side lid and said supply side pan to form a lower supply side inlet chamber and an upper supply side outlet chamber;

a return side filter media sealingly disposed between said return side lid and said return side pan to form a lower return side inlet chamber and an upper return side outlet chamber;

a supply side outlet on said supply side lid for connecting the supply side outlet chamber to a supply side inlet of said transmission;

a return side inlet on said return side lid for connecting the return side inlet chamber to a return side outlet of said transmission;

a supply side inlet on said supply side pan for connecting a sump of said transmission to the supply side inlet chamber; and a return side outlet extending through said upper return side lid and said upper supply side lid for connecting the return side outlet chamber to said supply side outlet chamber.

10. The fluid filtration assembly according to claim 9, wherein said upper supply side lid and said upper return side lid are formed as one piece.

11. The fluid filtration assembly according to claim 10, wherein said return side filter media is operable to remove particulates at least of a first size and the supply side filter media is operable to remove particulates of at least a second size, and the particulates of the first size being smaller than particulates of the second size.

12. The fluid filtration assembly according to claim 9, further comprising said vehicle transmission including said sump, wherein said filtration assembly is disposed in said sump.

* * * * *